US010894720B1

(12) United States Patent
Khe et al.

(10) Patent No.: US 10,894,720 B1
(45) Date of Patent: Jan. 19, 2021

(54) SYSTEMS, DEVICES, AND/OR METHODS FOR REACTIVE NANO SILICATE (71) Applicant: HK Invent Inc., Ho Chi Minh (VN)

(72) Inventors: Nguyen Khe, Ho Chi Minh (VN); Vo Hoai Linh, Ho Chi Minh (VN)

( * ) Notice: Subject to any disclaimer, the term of this patent is extended or adjusted under 35 U.S.C. 154(b) by 0 days.

(21) Appl. No.: 16/457,983

(22) Filed: Jun. 29, 2019

(51) Int. Cl.
  *C01B 33/20* (2006.01)
  *B82Y 30/00* (2011.01)

(52) U.S. Cl.
  CPC ............. *C01B 33/20* (2013.01); *B82Y 30/00* (2013.01); *C01P 2002/01* (2013.01); *C01P 2002/88* (2013.01); *C01P 2004/64* (2013.01); *C01P 2006/32* (2013.01); *C01P 2006/90* (2013.01)

(58) Field of Classification Search
  CPC ..... C01B 33/20; B82Y 30/00; C01P 2002/01; C01P 2002/88; C01P 2004/64; C01P 2006/32; C01P 2006/90
  See application file for complete search history.

(56) References Cited

U.S. PATENT DOCUMENTS

2018/0099905 A1* 4/2018 Khe ..................... C09D 11/03

OTHER PUBLICATIONS

Kroke et al. ("Silazane derived ceramics and related materials." Materials Science and Engineering: R: Reports 26.4-6 (2000): 97-199 (Year: 2000).*
Yin et al. ("Viscoelasticity of shell-crosslinked core-shell nanoparticles filled polystyrene melt."Polymer 53.18 (2012): 3968-3974.) (Year: 2012).*

* cited by examiner

*Primary Examiner* — Anthony J Zimmer
*Assistant Examiner* — Ricardo D Morales
(74) *Attorney, Agent, or Firm* — Dale Jensen, PLC; Dale Jensen (57) ABSTRACT

Certain exemplary embodiments can provide a reactive nano silicate, which can comprise a silica/acid composite comprising reactive functional groups activated by an intramolecular disturber. The reactive functional groups can comprise at least one of —SiH, —SiOH, silazane, durazane, polysilazane, and spiro silazane. The intramolecular disturber can comprise at least one of $Fe_2O_3$, $Xe_2O$, $SnO_2$, $Al_2O_3$, $SiO_2$, $TiO_2$, or a rare earth element oxide.

16 Claims, 13 Drawing Sheets

TEM IMAGE OF SAC

SYSTEMS, DEVICES, AND/OR METHODS FOR REACTIVE NANO SILICATE

BRIEF DESCRIPTION OF THE DRAWINGS

The patent or application file contains at least one drawing executed in color. Copies of this patent or patent application publication with color drawing(s) will be provided by the Office upon request and payment of the necessary fee. FIG. 001, FIG. 002 FIG. 003, FIG. 004, FIG. 005, FIG. 007, FIG. 008, and FIG. 009 are executed in color. A wide variety of potential practical and useful embodiments will be more readily understood through the following detailed description of certain exemplary embodiments, with reference to the accompanying exemplary drawings in which:

FIG. 001 is a transmission electron microscopy ("TEM") image of an exemplary silica/acid composite in a house-painting product;

FIG. 002 is a schematic diagram of an exemplary reactive nano silicate ("RNS") process;

FIG. 003 is a photograph of a water drop on a dry surface coated with RNS;

FIG. 004 is a graph of thermal gravimetric analysis ("TGA") data of an exemplary silica/acid composite ("SAC") and RNS;

FIG. 005 is a Fourier-transform infrared spectroscopy ("FtIR") chart of exemplary SAC and RNS substances;

FIG. 006A illustrates a TEM image of an exemplary SAC (shown on left) and an exemplary RNS (shown on right) (the image scale is 200 nm);

FIG. 006B illustrates a TEM image of an exemplary SAC (shown on left) and an exemplary RNS (shown on right) (the image scale is 100 nm);

FIG. 006C illustrates a TEM image of an exemplary SAC (shown on left) and an exemplary RNS (shown on right) (the image scale is 50 nm);

FIG. 006D illustrates a TEM image of an exemplary SAC (shown on left) and an exemplary RNS (shown on right) (the image scale is 20 nm);

FIG. 007 is a graph of TGA data of styrene-butadiene rubber ("SBR") doped with a graphene hybrid composite ("GHC") in the presence of an exemplary RNS;

FIG. 008 is a graph of TGA data of SBR doped with GHC without RNS;

FIG. 009 is a graph of TGA data of Natural Rubber ("NR") doped with GHC in the presence of an exemplary RNS; and FIG. 010 is a schematic representation of a band gap model of electron transfer between SAC and disturber molecules.

DETAILED DESCRIPTION

Certain exemplary embodiments can provide a reactive nano silicate, which can comprise a silica/acid composite comprising reactive functional groups activated by an intramolecular disturber. The reactive functional groups can comprise at least one of —SiH, —SiOH, silazane, durazane, polysilazane, and spiro silazane. The intramolecular disturber can comprise at least one of $Fe_2O_3$, $Xe_2O$, $SnO_2$, $Al_2O_3$, $SiO_2$, $TiO_2$, or a rare earth element oxide.

Silica particles (chemically "$SiO_2$") are very inert and can be utilized as reinforcement filler for rubber.

However, poor compatibility of silica with rubber can result in a use of further energy and chemicals, such as surfactants, to embed silica into a rubber substance.

U.S. Patent Publication 20180099905 (the "'905 Publication") disclosed a composite formed from liquid glass with specific carboxylic acid. In the '905 Publication, liquid glass is extracted from paddy husk, which husk originated in Vietnam. The product can be called a silica/acid composite ("SAC"), which exhibits a primary particle size in the range of approximately 5 nm. These primary particles can stick to each other to form a translucent white gel.

In an attempt to find out if the SAC gel can be used as a nano additive to improve material durability, SAC was mixed with naked (i.e., no polymeric binder) water based house painting to test out water proofing properties. The conventional house paint comprising an emulsion polymer prevented at least 70% water penetration. The adding of 30% of the SAC gel into the house paint containing no emulsion polymer did not provide any prevention of water penetration through painting layer.

Figure 001:
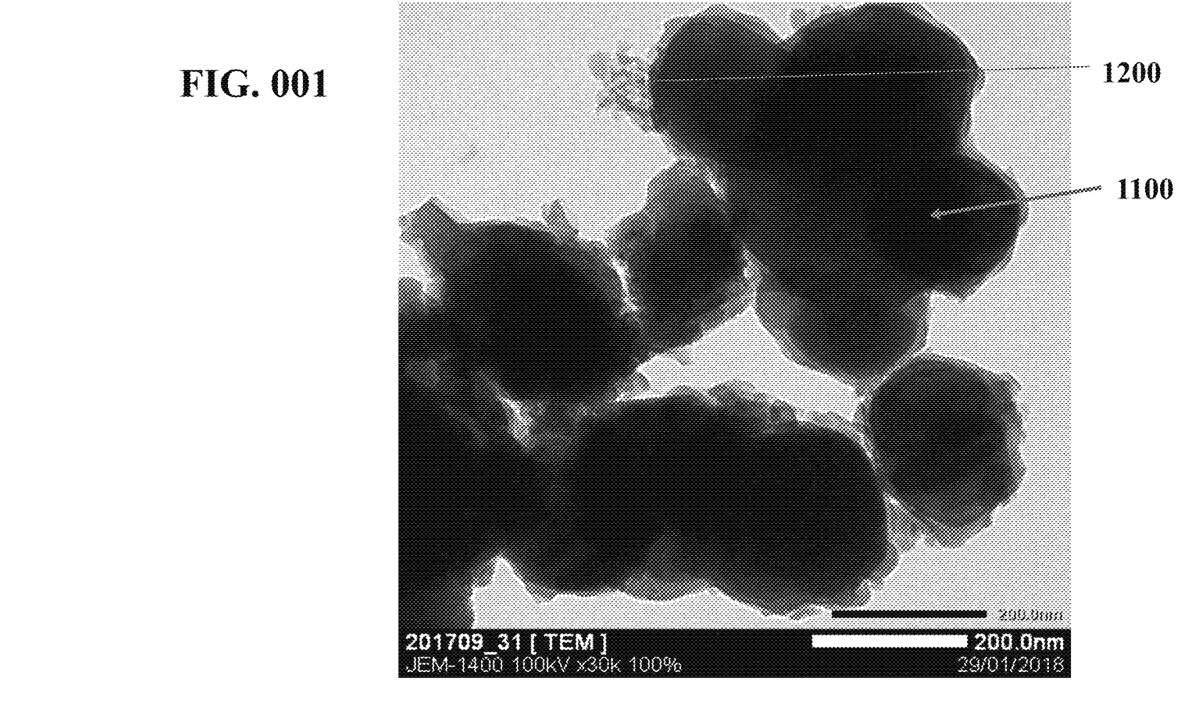

FIG. 001 is a TEM image of an exemplary silica/acid composite in a house-painting product as described in the '905 Publication. FIG. 001 illustrates a colorant 1100 and a SAC 1200. One can recognize that upon drying under atmospheric conditions for approximately 72 hours, the SAC accumulated into agglomerates on the surface of colorant 1100 but did not fully cover colorant 1100. This result showed that SAC was not capable of fully shielding colorant 1100 of the house-painting product from water attack.

In another exemplary of the embodiment, SAC was added onto rubber latex. The mixture was uniform due to relatively good compatibility between SAC and rubber latex. However, upon being dried, the rubber comprising SAC did not show any significant improvement in physical properties.

Based upon these tests, it was concluded that SAC is relatively inert and non-reactive. The SAC showed smaller particle sizes than other gels, but was not found to be robust enough to cause any significant enhancement in material durability.

In an attempt to change the nature of SAC, we successfully incorporated an SAC disturber into the network, which can convert the non-reactive SAC into reactive species named as reactive nano silicate (RNS), which is more interactive with other materials. The SAC disturbing molecule can be in the SAC family, but not exactly the same physical structure. Examples of the SAC disturber are metal oxides such as, but not limited to, $Fe_2O_3$, $TiO_2$, $Xe_2O$, $SnO_2$, $Al_2O_3$, $SiO_2$, $TiO_2$, $V_2O_5$, $In_2O_3$, rare earth oxide such as $La_2O_3$, lanthanium oxide, cerium oxide, neodymium oxide, samarium oxide, and the like.

RNS is suspected to carry various reactive functional groups provided from different silicate sources, for example, but not limited to:

-continued (B)

(a) PHPS  (b) Durazane 1800

(C)

(D)

Figure 002:
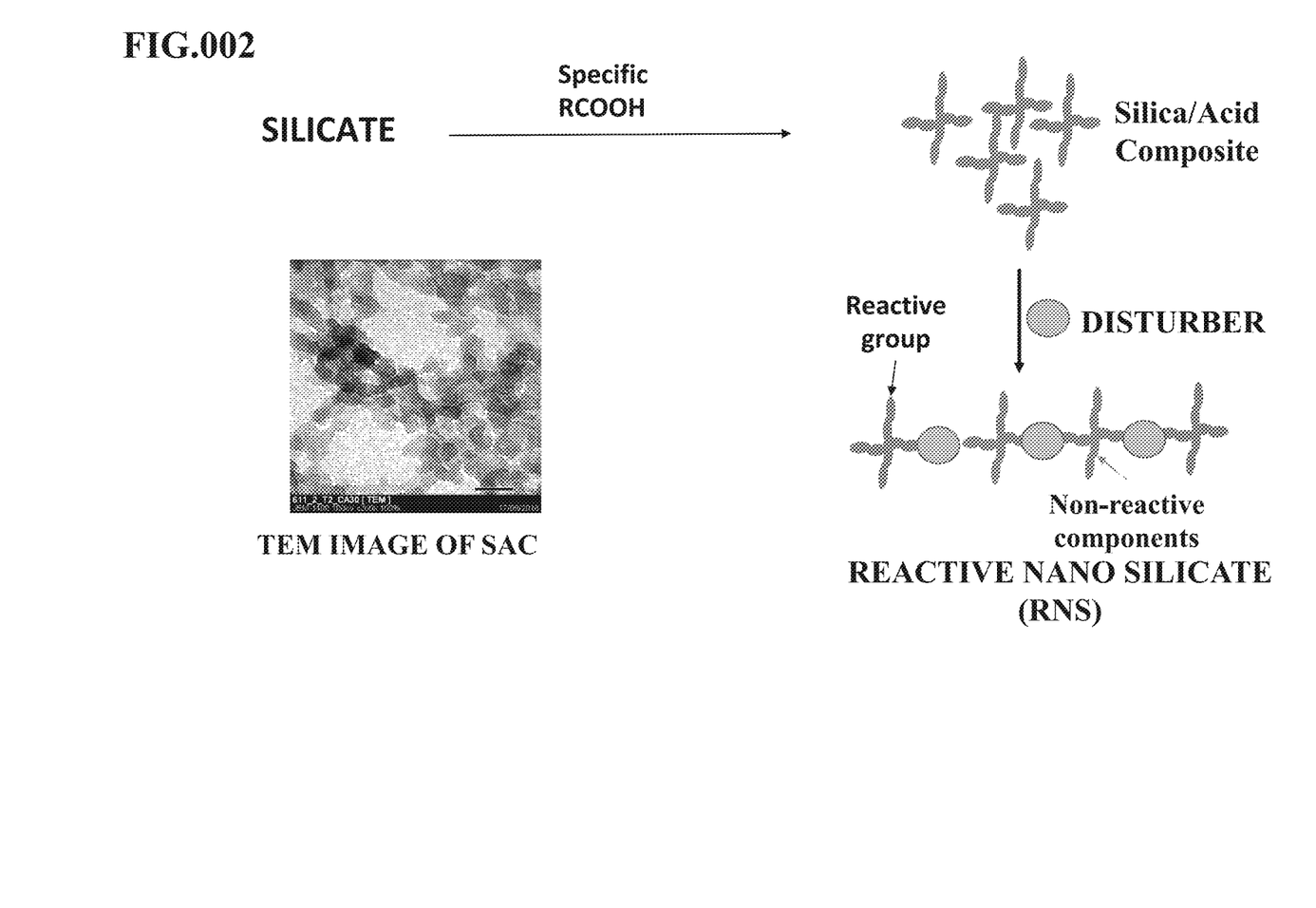

FIG. 002 is a schematic diagram of an exemplary RNS process. One can see that in order to form a RNS, there is a need of a disturber molecule other than SAC.

Figure 003:
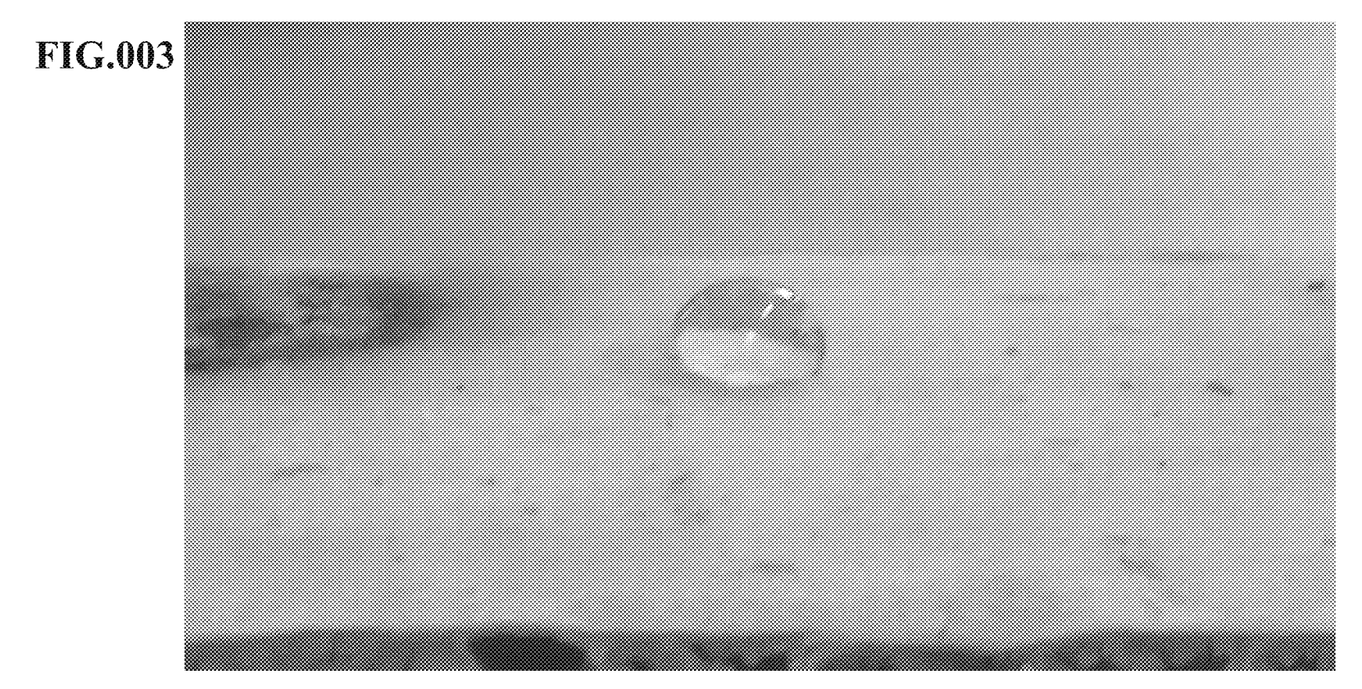

The RNS has been shown to be self-reactive and capable to form a rigid solid film upon drying. Accordingly, RNS has film-forming properties. FIG. 003 is a photograph of a water drop on a dry surface coated with RNS. The photograph shows that a dried film of RNS repels water.

At this point in time, the exact chemical structure of RNS is still unknown. The following experiments verified that RNS does exist.

Figure 004:
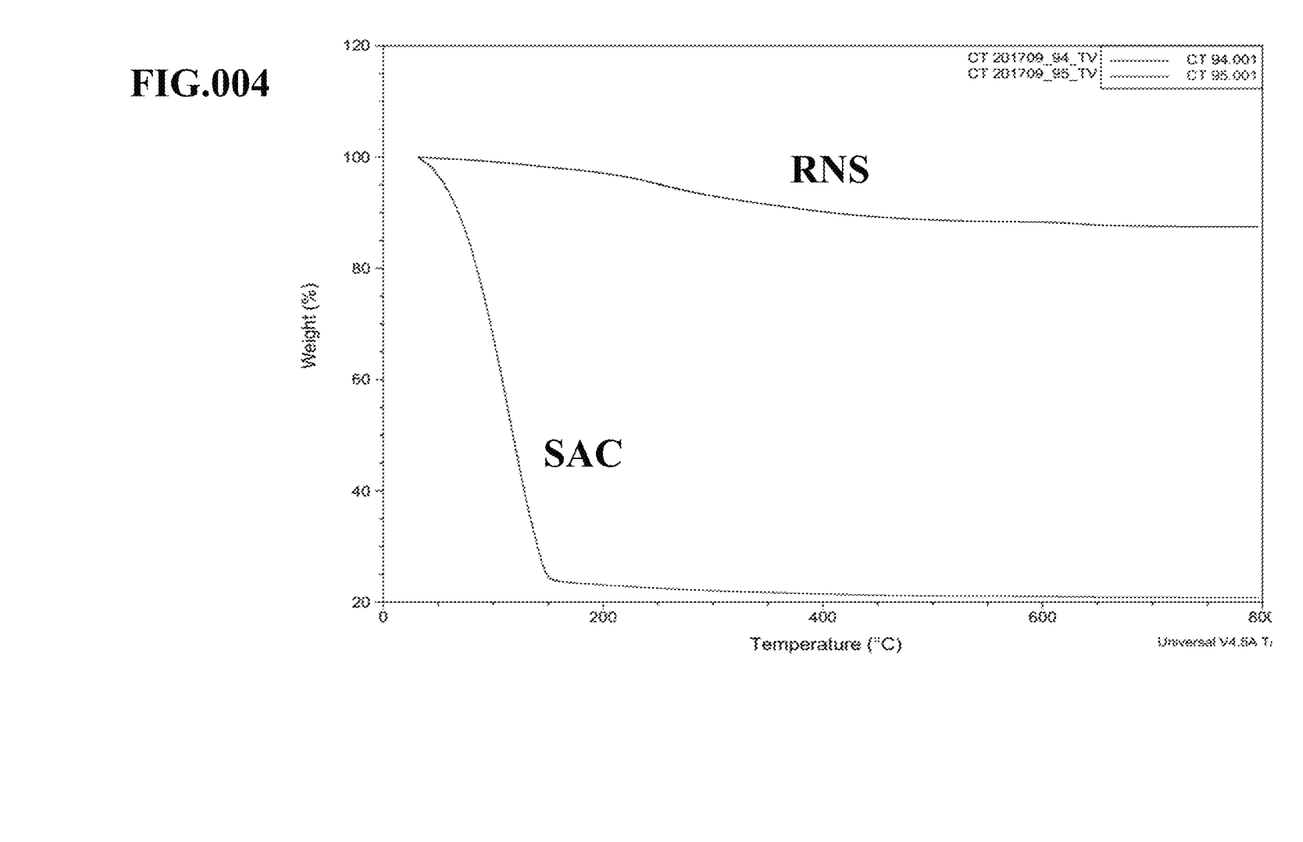

FIG. 004 is a graph of thermal gravimetric analysis data of an exemplary silica/acid composite SAC and RNS. One can recognize that SAC is substantially thermally decomposed at approximately 150° C. while the RNS continued to survive beyond approximately 800° C., which suggests that SAC individual particles connect to each other into RNS due to the presence of the disturber, which in this embodiment was fumed silica.

Figure 005:
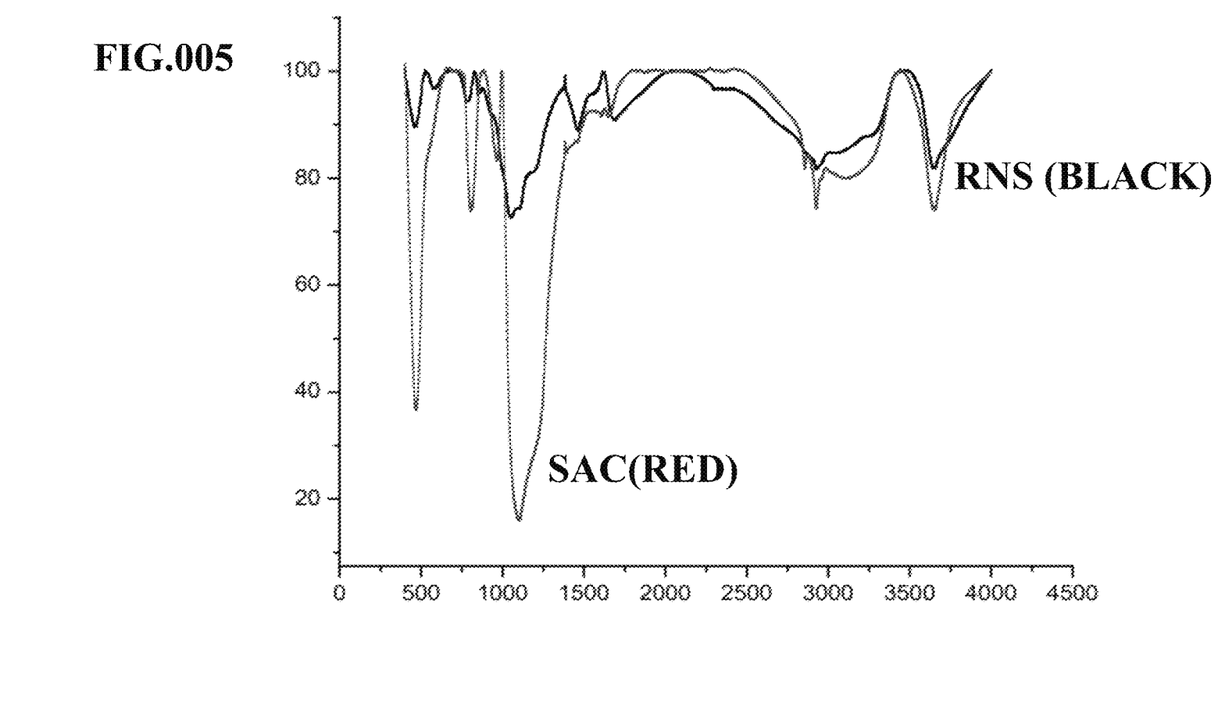

FIG. 005 is an FtIR chart of exemplary SAC and RNS substances. FIG. 005 is an FtIR chart of an exemplary SAC (in red) and an exemplary RNS (in black). These charts are overlaid to show that the SAC and RNS are different species.

Figure 006A:
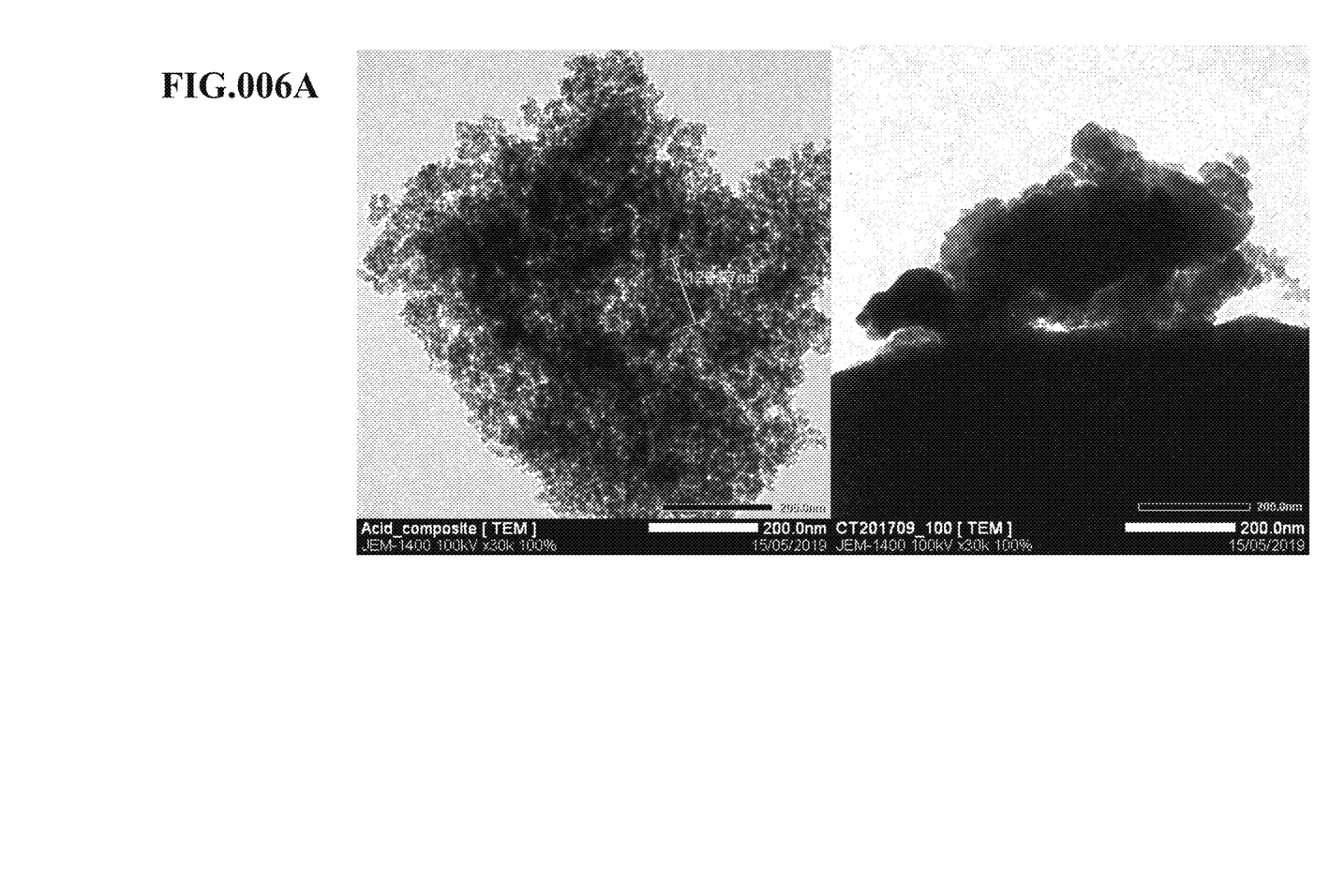
Figure 006B:
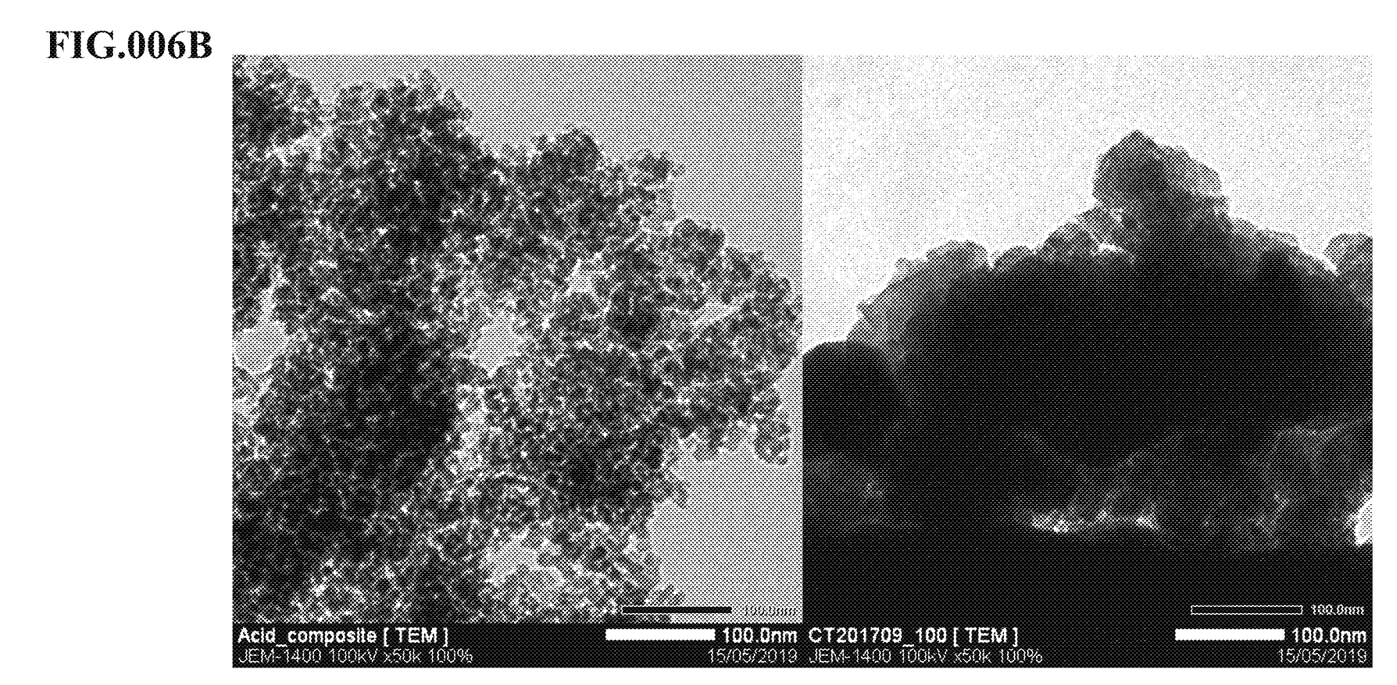
Figure 006C:
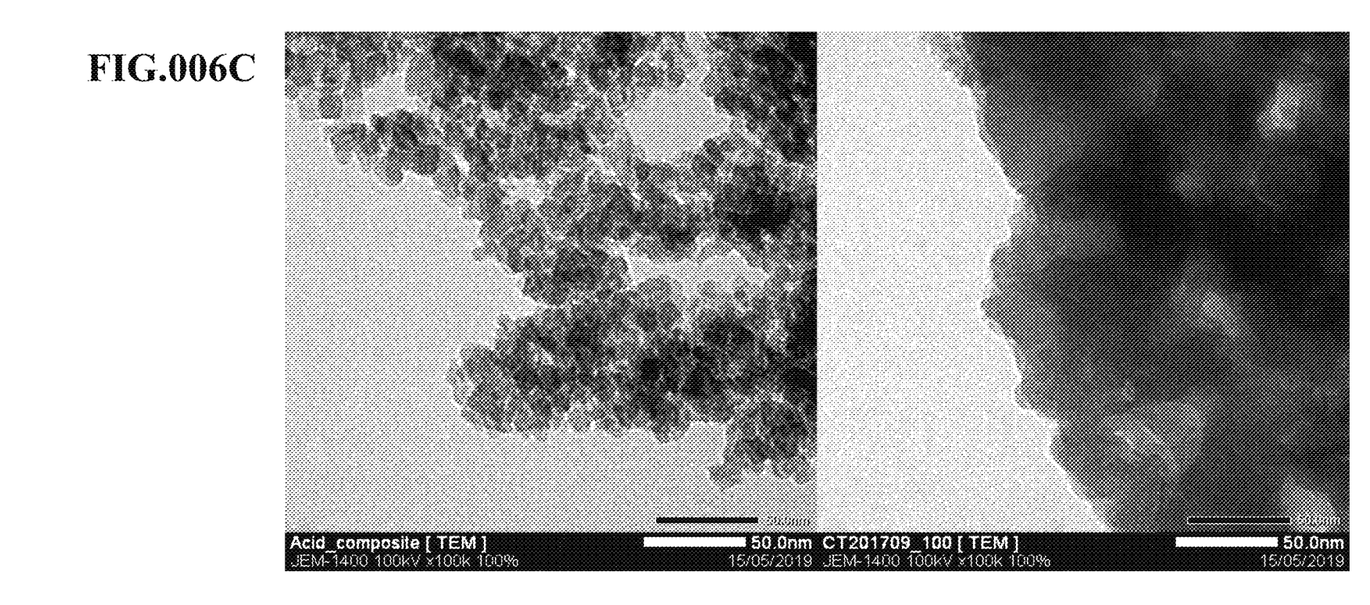
Figure 006D:
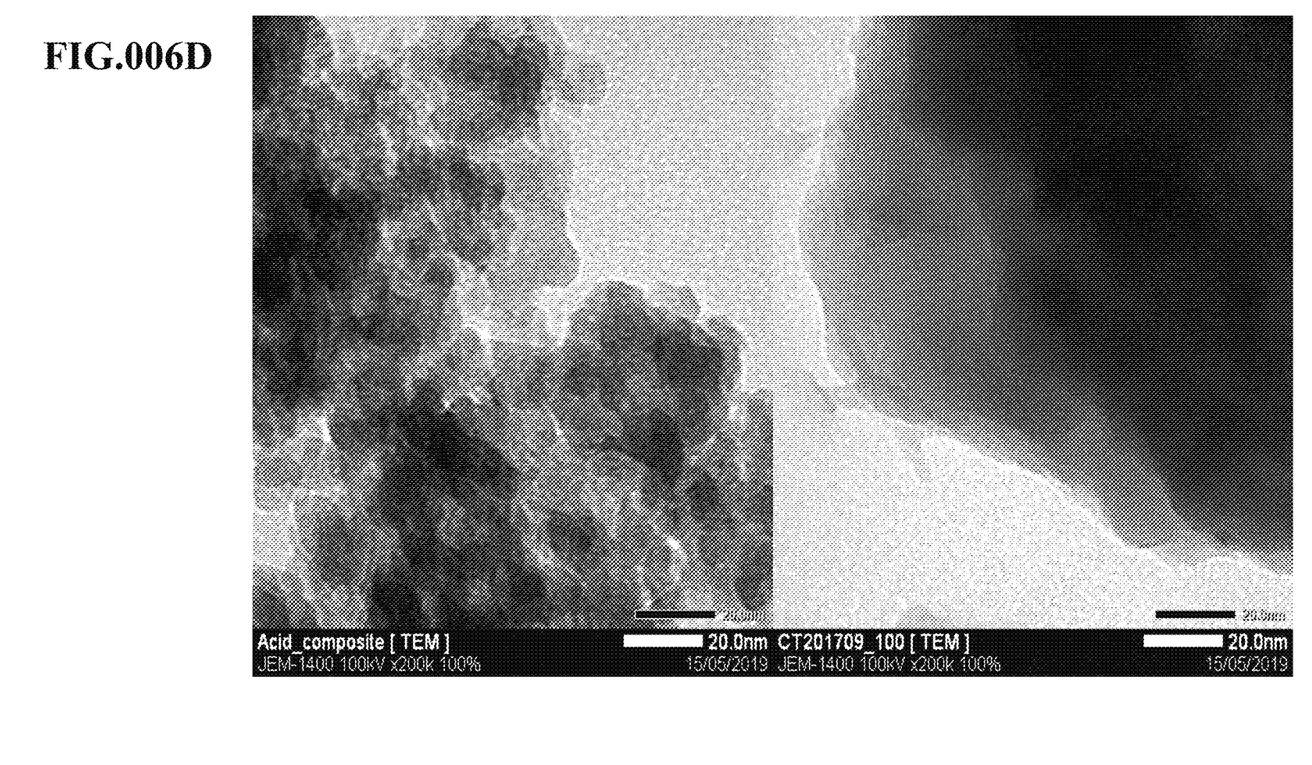

FIG. 006A illustrates a TEM image of an exemplary SAC (shown on left) and an exemplary RNS (shown on right) (the image scale is 200 nm). In another exemplary of the embodiment, FIGS. 006A, 006B, 006C, and 006D respectively exhibits TEM images of SAC (left) and of RNS (right) taken in various scales. One can recognize that SAC appears as individual particle while RNS shows a particle connected into cloudy membrane. Thus, this is evidence that SAC and RNS are different species.

Now, it can be suggested that the stranger molecule added on the solution of SAC, somehow, had successfully disturbed the structure of SAC and converted the non-reactive nature of SAC into reactive species, which is RNS. RNS can have a strong intramolecular interaction to form a film.

Figure 007:
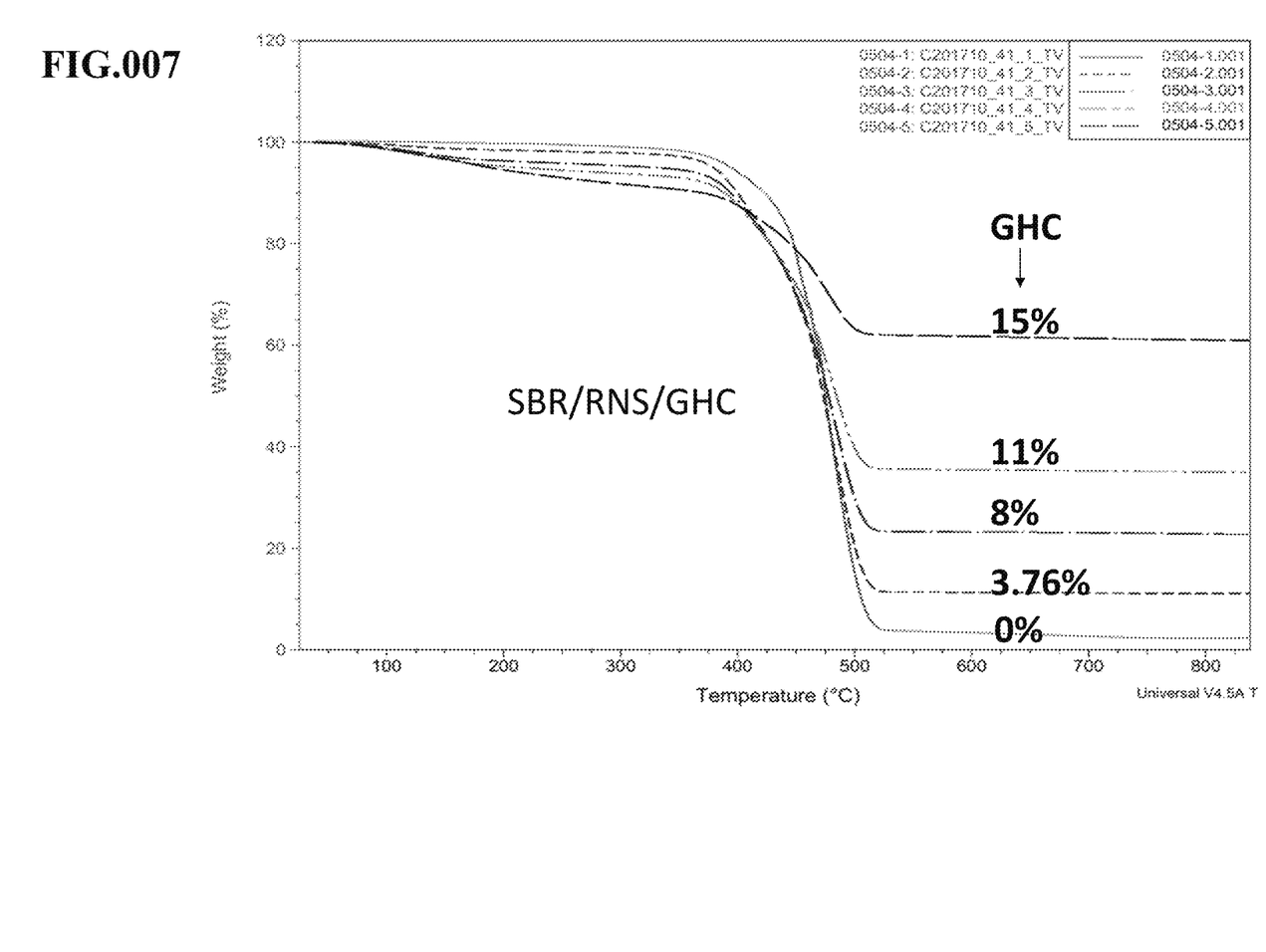
Figure 008:
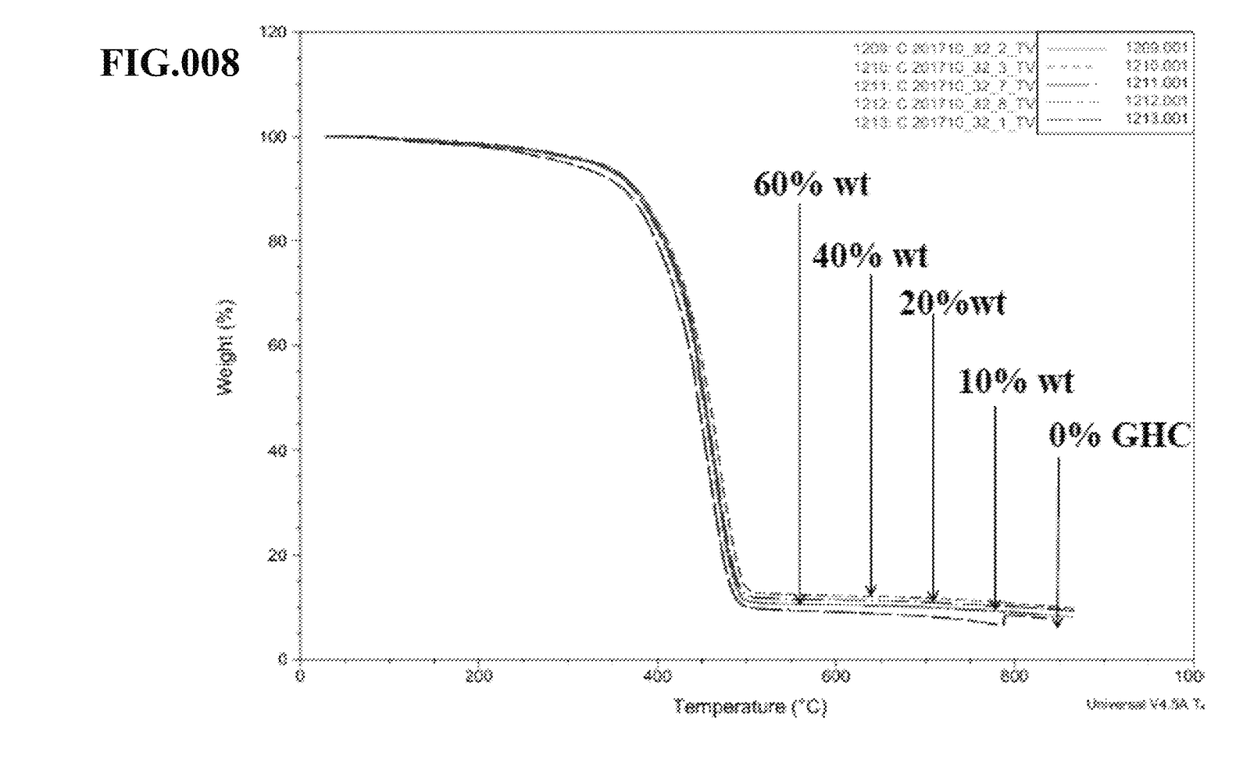

In another exemplary of the embodiment, GHC (as disclosed in U.S. Pat. No. 9,460,827) was added with different levels into KRL341 SBR (obtained from Kumho, a company of South Korea) containing RNS. KRL341 SBR is a commercially available SBR, which is a synthetic rubber as opposed to a natural rubber. The mixture was baked at approximately 85° C. for approximately 72 hours then exposed to TGA test. The data is illustrated in FIG. 007. FIG. 007 is a graph of TGA data of SBR doped with GHC in the presence of an exemplary RNS. One can recognize the heat resistance of SBR increased with increased concentration of GHC. Another exemplary of the embodiment that GHC alone added into SBR showed no apparent reinforcement as seen in FIG. 008. FIG. 008 is a graph of TGA data of SBR doped with GHC without RNS.

Figure 009:
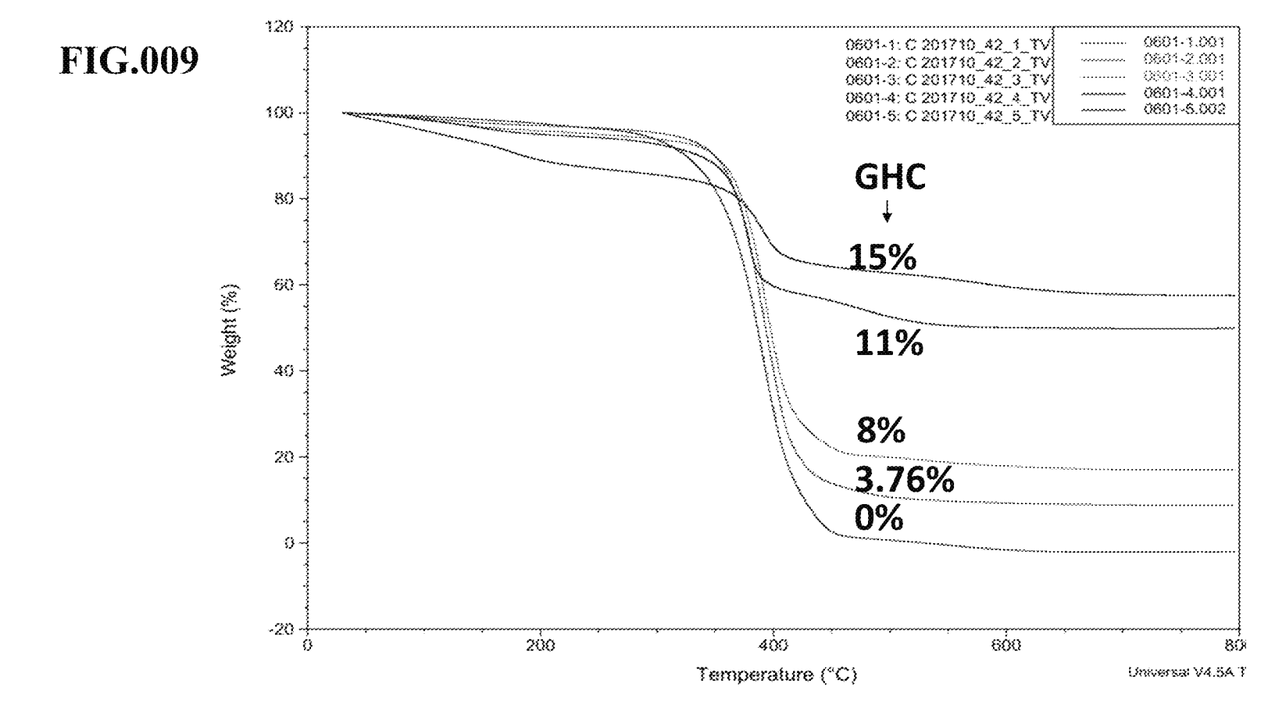

In another exemplary of the embodiment, the above experiment was repeated except that Natural Rubber ("NR") was used instead of SBR. FIG. 009 is a graph of TGA data of Natural Rubber ("NR") doped with GHC in the presence of an exemplary RNS. A similar reinforcement effect was observed with NR doped with GHC in the presence of RNS.

It is suggested from this result that RNS is reactive; RNS can react with both rubber and GHC and enable chemical bonding of GHC into rubber. Without RNS, GHC is substantially inert relative to rubber such as SBR and natural rubber. The chemical bonding of GHC with rubber can cause reinforcement of rubber with GHC.

It should be recognized from the above results that the reinforcement effect of rubber with GHC is due to crosslinking of rubber polymer chain via a GHC/RNS bridge. The crosslinking of rubber chain in this case is similar to the traditional sulfur vulcanization. However, the crosslinking due to GHC/RNS occurs at as low a temperature as approximately 85° C. This is actually a low temperature cure system.

Certain exemplary embodiments can provide a reactive nano silicate, which can comprise a silica/acid composite comprising reactive functional groups activated by an intramolecular disturber. The reactive functional groups can comprise at least one of —SiH, —SiOH, silazane, durazane, polysilazane, and spiro silazane. The intramolecular disturber can comprise at least one of $Fe_2O_3$, $Xe_2O$, $SnO_2$, $Al_2O_3$, $SiO_2$, $TiO_2$, or a rare earth element oxide.

Figure 010:
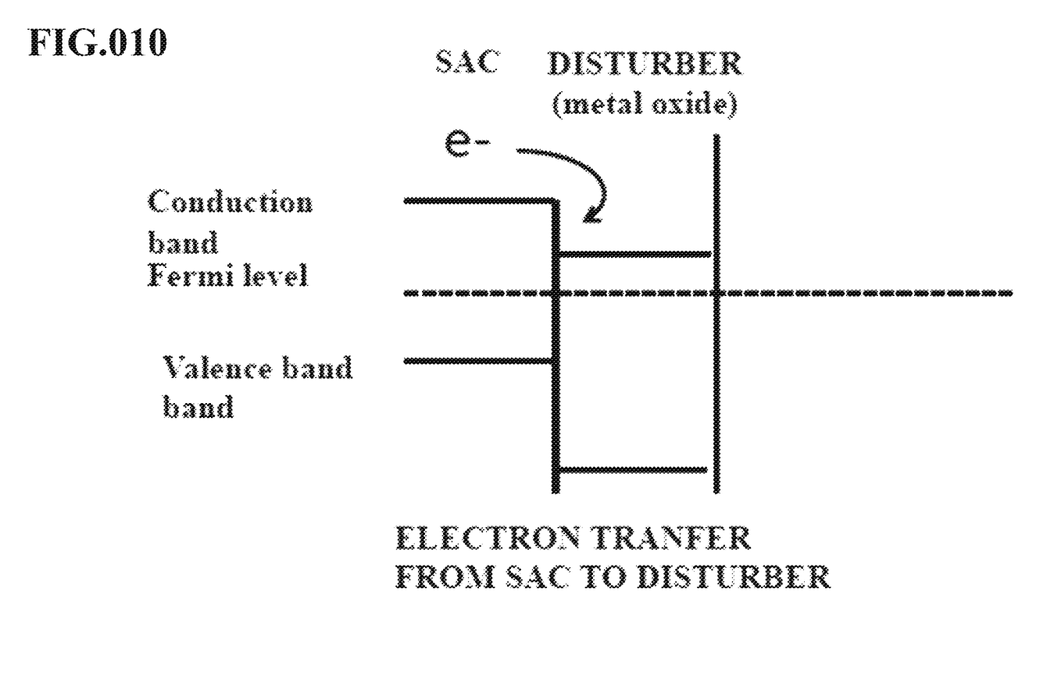

The mechanism causing increased reactivity of SAC by disturber molecule is not clear at this point in time. However, specific disturber molecules somehow become molecularly coupled to SAC and successfully transfer electrons from SAC into disturber molecules causing electron starving of SAC and increased SAC reactivity as illustrated in FIG. 010. FIG. 010 is a schematic representation of a band gap model of electron transfer between SAC and disturber molecules.

According to this model, SAC should be more electrically conductive than disturber. The thermal electron from conduction band of SAC can be transferred into conduction band of disturber. Thus, disturber is relatively more electron acceptor than SAC. The disturber can be found in a group of oxides such as, but not limited to, $Fe_2O_3$, $Xe_2O$, $SnO_2$, $Al_2O_3$, $SiO_2$, $TiO_2$, or a rare earth element oxide.

The reactive nano silicate can exhibit intramolecular interaction caused by the reactive functional groups. The reactive nano silicate can exhibit:
film forming properties;
water proofing properties;

flame retardant properties;
heat resistant properties;
ultraviolet energy ("UV") blocking properties; and/or
weather resistant properties, etc.
The reactive nano silicate can be reactive with:
a polymer;
a hydroxylated material; and/or
a hydroxylated nano carbon, such as a hydroxylated nano carbon that comprises at least one of a surface modified carbon black, carbon nano tube, fullerene, thin film graphene, graphene oxide, reduced graphene oxide, graphene nano platelet, graphene hybrid composite, a water soluble GHC, and/or an engraved GHC, etc.
The reactive nano silicate can be used as a precursor to:
provide a reinforcement capability of graphene in rubber, wherein the reinforcement capability of graphene in rubber in GHC/RNS can be a low temperature cure effect;
enhance thermal conductivity of graphene in media;
enhance thermal conductivity of graphene in boron nitride; and/or
enhance thermal conductivity of graphene in aluminium nitride, etc.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
activity—an action, act, step, and/or process or portion thereof
and/or—either in conjunction with or in alternative to.
apparatus—an appliance or device for a particular purpose.
article—a particular item or object.
associate—to join, connect together, and/or relate.
average—a number expressing a central or typical value in a set of data, in particular the mean, which is calculated by dividing the sum of the values in the set by their number.
building—a structure with a roof and walls, such as a house, school, store, or factory.
can—is capable of, in at least some embodiments.
cause—to produce an effect.
cellulose—an insoluble substance that is the main constituent of plant cell walls and of vegetable fibers such as cotton.
cement—a powdery substance made with calcined lime and clay.
ceramic—a material made of clay and hardened by heat.
chemical stability—when a system is in substantial chemical equilibrium with its environment.
comprising—including but not limited to.
configure—to make suitable or fit for a specific use or situation.
constructed to—made to and/or designed to.
convert—to transform, adapt, and/or change.
crack—to break without a complete separation of the parts.
create—to bring into being.
curer—to vulcanize (rubber).
define—to establish the outline, form, or structure of
device—a machine, manufacture, and/or collection thereof.
dissolution—a process by which two substances form a solution.
durability—an ability to withstand wear, pressure, or damage.
emulsion polymer—a type of a radical polymer (i.e., a polymer formed via the successive addition of free radical building blocks) produced via an emulsion incorporating water, monomer, and surfactant.
energy storage system—one or more components capable of acting as a repository for electrical energy.
film forming properties—having a capability to make a layer of material ranging from fractions of a nanometer (monolayer) to several micrometers in thickness.
flame retardant properties—having an ability to treat substances such that ignition by a variety of different physical and chemical methods is prevented or slowed.
functional group—a group of atoms responsible for the characteristic reactions of a particular compound.
generate—to create, produce, give rise to, and/or bring into existence.
graphene hybrid composite—a substance comprising graphene as described in U.S. Pat. No. 9,460,827, which substance comprises carbon nanotubes.
heat resistant properties—having an ability to treat substances such that heat energy is reflected or absorbed without igniting.
inkjet printing ink—a colored fluid that is used in an inkjet printer that.
intramolecular disturber—a substance that can convert a silica/acid composite into a more reactive species named as reactive nano silica ("RNS").
intramolecular interaction—spontaneously reactive with other substances.
latex—a milky fluid from a plant that is the source of rubber.
low temperature—occurring at a temperature of less than approximately 100° C.
may—is allowed and/or permitted to, in at least some embodiments.
metal—a solid material that is typically hard, shiny, malleable, fusible, and ductile, with good electrical and thermal conductivity (e.g., iron, gold, silver, copper, and aluminum, and alloys such as brass and steel).
method—a process, procedure, and/or collection of related activities for accomplishing something.
mix—to combine two or more substances.
multifunctional carboxylic acid—an acid comprising a carboxyl functional group, e.g., oxalic acid, tartaric acid, and citric acid.
opaque—substantially impervious to light transmission.
particle size—a largest dimension of a solid minute portion of matter.
passive silicate—a
plurality—the state of being plural and/or more than one.
polymer—a substance that has a molecular structure consisting primarily or entirely of a large number of similar units bonded together,
predetermined—established in advance.
printing—the production of books, newspapers, or other printed material.

provide—to furnish, supply, give, and/or make available.
rare earth element—one or more of cerium ("Ce"), dysprosium ("Dy"), erbium ("Er"), europium ("Eu"), gadolinium ("Gd"), holmium ("Ho"), lanthanum ("La"), lutetium ("Lu"), neodymium ("Nd"), praseodymium ("Pr"), promethium ("Pm"), samarium ("Sm"), scandium ("Sc"), terbium ("Tb"), thulium ("Tm"), ytterbium ("Yb"), and yttrium ("Y").
reactive—capable of reacting relatively quickly with substances
receive—to get as a signal, take, acquire, and/or obtain.
resistance—an ability not to be affected adversely by something.
rice husk—a hard protecting coverings of grains of rice.
rubber compounding—a process that molds a tough elastic polymeric substance made from the latex of a tropical plant or synthetically.
rubber tires—a ring-shaped vehicle component comprising rubber that covers the wheel's rim to protect it and enable better vehicle performance.
rubber tree—a tree that produces the latex from which rubber is manufactured.
SC nanocomposite—a silica/acid composite.
select—to make a choice or selection from alternatives.
set—a related plurality.
silica/acid composite—a substance comprising a silica core and having a specific acidic shell. The substance having an X-ray diffraction chart with diffraction peaks appearing at approximately two theta=2°, 27.75°, 41°.
specific acid—an acid selected for a specific function.
solvent—a substance that is able to dissolve other substances.
substantially—to a great extent or degree.
sulfonic acid—an organic acid containing the group —$SO_2OH$.
supercapacitor—a high-capacity electrochemical capacitor with capacitance values much higher than other capacitors (but lower voltage limits) that bridge a gap between electrolytic capacitors and rechargeable batteries. Supercapacitors utilize use electrostatic double-layer capacitance or electrochemical pseudocapacitance. Supercapacitors have a range of capacitances between approximately 0.001 F and approximately 6,000 F. Supercapacitors have cell voltages ranging between approximately 1.4 volts and approximately 125 volts.
surface modified carbon—carbon black that has been chemically modified with specific functional groups. Cab-o-jet 200 and Cab-o-jet 300 are examples of surface modified carbon black,
system—a collection of mechanisms, devices, machines, articles of manufacture, processes, data, and/or instructions, the collection designed to perform one or more specific functions.
thermal conductivity—an ability of a substance to conduct heat.
thermoplastic—a substance (especially synthetic resins) that becomes plastic on heating and hardens on cooling and can be repetitively subjected to such processes.
thermoset—synthetic plastic materials that strengthen while being heated, but cannot be successfully remolded or reheated after their initial heat-formation.
toughness—an ability of a material to absorb energy and plastically deform without fracturing.
translucent—permitting light to pass through but diffusing the light so that persons, objects, etc., on an opposite side are not clearly visible.
UV blocking properties—having an ability to treat substances such that ultra-violet rays are reflected from the substance.
vehicle—a system that transports people or goods such as a car, truck, or cart.
via—by way of and/or utilizing.
water proofing properties—having an ability to treat substances so as to be substantially unaffected by water or resisting the ingress of water under specified conditions.
water soluble—capable of being dissolved in a solvent that comprises $H_2O$.
water soluble graphene hybrid composite—a substance comprising water soluble graphene hybrid composite as described in U.S. patent application Ser. No. 15/490,842.
wear—to damage by friction or use.
weight—a value indicative of importance.
wet dispersion—a system in which particles are dispersed in a continuous aqueous phase.
weather resistant properties—having an ability to treat substances so as to be substantially unaffected by water or temperature fluctuations.
wood—a hard fibrous material that forms the main substance of the trunk or branches of a tree or shrub.

NOTE

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:
  there is no requirement for the inclusion of any particular described or illustrated characteristic, function, activity, or element, any particular sequence of activities, or any particular interrelationship of elements;
  no characteristic, function, activity, or element is "essential";
  any elements can be integrated, segregated, and/or duplicated;
  any activity can be repeated, any activity can be performed by multiple entities, and/or any activity can be performed in multiple jurisdictions; and
  any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A reactive nano silicate, comprising:
   a silica/acid composite comprising reactive functional groups activated by an intramolecular disturber, wherein:
   the reactive functional groups comprise at least one of —SiH, —SiOH, silazane, durazane, polysilazane, spiro silazane;
   the intramolecular disturber is an oxide that comprises at least one of $Fe_2O_3$, $Xe_2O$, $SnO_2$, $Al_2O_3$, $SiO_2$, $TiO_2$, or rare earth element oxide.

2. The reactive nano silicate of claim 1, wherein:
   the reactive nano silicate exhibits intramolecular interaction caused by the reactive functional groups.

3. The reactive nano silicate of claim 1, wherein:
   the reactive nano silicate exhibits film forming properties.

4. The reactive nano silicate of claim 1, wherein:
   the reactive nano silicate exhibits water proofing properties.

5. The reactive nano silicate of claim 1, wherein:
   the reactive nano silicate exhibits flame retardant properties.

6. The reactive nano silicate of claim 1, wherein:
   the reactive nano silicate exhibits heat resistant properties.

7. The reactive nano silicate of claim 1, wherein:
   the reactive nano silicate exhibits UV blocking properties.

8. The reactive nano silicate of claim 1, wherein:
   the reactive nano silicate exhibits weather resistant properties.

9. The reactive nano silicate of claim 1, wherein:
   the reactive nano silicate is reactive with a polymer.

10. The reactive nano silicate of claim 1, wherein:
    the reactive nano silicate is reactive with a hydroxylated material.

11. The reactive nano silicate of claim 1, wherein:
    the reactive nano silicate is reactive with a hydroxylated nano carbon.

12. The reactive nano silicate of claim 1, wherein:
    the reactive nano silicate is reactive with a hydroxylated nano carbon that comprises at least one of a surface modified carbon black, carbon nano tube, fullerene, thin film graphene, graphene oxide, reduced graphene oxide, graphene nano platelet, graphene hybrid composite, a water soluble GHC, and an engraved GHC.

13. The reactive nano silicate of claim 1, wherein:
    the reactive nano silicate is used as a precursor to provide a reinforcement capability of graphene in rubber, wherein the reinforcement capability of graphene in rubber in GHC/RNS is a low temperature cure effect.

14. The reactive nano silicate of claim 1, wherein:
    the reactive nano silicate is used as a precursor to enhance thermal conductivity of graphene in media.

15. The reactive nano silicate of claim 1, wherein:
    the reactive nano silicate is used as a precursor to enhance thermal conductivity of graphene in boron nitride.

16. The reactive nano silicate of claim 1, wherein:
    the reactive nano silicate is used as a precursor to enhance thermal conductivity of graphene in aluminium nitride.

\* \* \* \* \*